US006779182B1

(12) United States Patent
Zolnowsky (10) Patent No.: US 6,779,182 B1
(45) Date of Patent: Aug. 17, 2004

(54) REAL TIME THREAD DISPATCHER FOR MULTIPROCESSOR APPLICATIONS

(75) Inventor: John E. Zolnowsky, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/174,111

(22) Filed: Oct. 17, 1998

Related U.S. Application Data

(63) Continuation of application No. 08/643,543, filed on May 6, 1996, now Pat. No. 5,826,081.

(51) Int. Cl.[7] .................................................. G06F 9/46

(52) U.S. Cl. ....................... 718/103; 718/102; 718/100; 709/203; 709/314

(58) Field of Search .............................. 709/101, 102, 709/103, 104, 105, 106, 315, 203, 314; 711/6; 718/100, 101, 102, 103, 104, 106, 107

(56) References Cited

U.S. PATENT DOCUMENTS

| 5,185,861 | A |   | 2/1993 | Valencia |
|---|---|---|---|---|
| 5,379,428 | A |   | 1/1995 | Belo |
| 5,515,538 | A | * | 5/1996 | Kleiman ...................... 709/103 |
| 5,692,193 | A | * | 11/1997 | Jagannathan et al. ....... 709/106 |
| 5,826,081 | A | * | 10/1998 | Zolnowsky .................. 709/103 |
| 6,006,247 | A | * | 12/1999 | Browning et al. .......... 709/102 |

FOREIGN PATENT DOCUMENTS

| GB | 2284081 | 5/1995 |
|---|---|---|
| WO | WO9706484 | 2/1997 |

OTHER PUBLICATIONS

D.L. Black: "Scheduling support for Concurrence and Parallelism in the Mach Computer System," Computer, vol. 23, No. 5, May 1990, Los Alamitos, CA, US, pp. 35–43.
J. Nakajima et al.: "Multimedia/Realtime Extensions for the Mach Operating system," Proceedings of the Summer Usenix Conference, Jun. 10–14, 1991, Nashville, TN, U.S., pp. 183–198.
"Dispatcher Queue to Provide Processor Affinity in a Multiprocessor," IBM Technical Disclosure Bulletin, vol. 37, No. 2a, Feb. 1994, Armonk, NY, U.S., pp. 573–575.
Khanna, Sandeep, Sebrée, Michael, Zolnowsky, John, "Real Time Scheduling in SunOS 5.0," Proceedings of the Winter 1992 Usenix Conference, 1992, pp. 375–390.

* cited by examiner

*Primary Examiner*—Majid A. Banankhah
(74) *Attorney, Agent, or Firm*—Beyer Weaver & Thomas LLP (57) ABSTRACT

The present invention provides a process scheduler or dispatcher for a multiprocessor system for real time applications. This embodiment of the present invention proposes a dispatcher model that maintains a dispatch queue for each processor and a separate global dispatch queue for unbound higher priority real time threads. A processor has its own queue and a dispatcher. Each queue has a separate schedule lock associated with it to protect scheduling operations. A processor's dispatcher selects a thread for execution from one of the queues in the system as a candidate thread to execute. When a candidate thread is selected for execution, the processor proceeds to verify against threads in the global real time queue and the processor's own dispatch queue to select a highest priority runnable thread in the system. Thus, the present invention allows the dispatcher to prevent race conditions and minimize lock contention while assuring that high-priority threads are dispatched as quickly as possible. The present invention is implemented by a synchronization between the operations of dispatching a thread and making a thread runnable.

14 Claims, 11 Drawing Sheets

REAL TIME THREAD DISPATCHER FOR MULTIPROCESSOR APPLICATIONS

CROSS-REFERENCE TO RELATED APPLICATIONS

This application is a continuation of U.S. application Ser. No. 08/643,543, filed May 6, 1996, now U.S. Pat. No. 5,826,081.

BACKGROUND OF THE INVENTION

1. Field of the Invention

This invention relates to a method and apparatus for efficient process scheduling for a multiprocessor system in a real time environment.

2. Background Art

The multiprocessor system (MP) is characterized by the presence of multiple CPUs or processors which cooperate on common or shared computational tasks. By having multiple processors in a single computer system, one can obtain performance enhancement by allowing many processors to share the computational load or by allowing many smaller tasks to be performed in parallel in separate processors. A multiprocessor system can also improve the system reliability since the failure of one processor will not necessarily lead to a crash of the entire system.

The introduction of multiple processors, however, complicates the resource management and allocation problem since two or more processes execute simultaneously in the kernel on separate processors. Thus, a scheduler module of an operating system needs to decide which processor should execute a process and in its general form, schedule a set of processes on a set of processors with arbitrary characteristics in order to optimize some objective function. This involves the selection of a process for execution from a set of processes.

The basic abstractions in an operating system include "tasks" and "threads." A task is a unit of resource management and a thread is a single flow-of-control. Each thread possesses a register state and a stack. The system associates with each thread extra state information relating to its schedulability. These include the thread dispatch priority and processor affinity that determines on which processors a thread can execute.

Figure 1A:
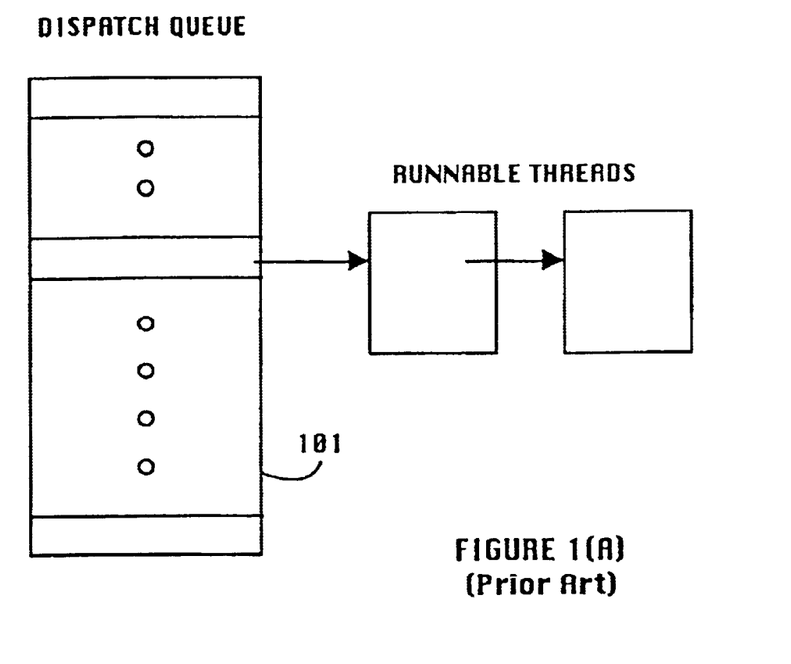
FIG. 1(A) shows a prior art single queue dispatcher system for a multiprocessor environment wherein a dispatcher uses an array of dispatch queues, indexed by dispatch priority.

FIG. 1(A) shows a prior art single queue dispatcher for a multiprocessor system wherein a dispatcher uses an array 101 of dispatch queues, indexed by dispatch priority. In FIG. 1(A), when a thread is made runnable, it is placed on a dispatch queue, typically at the end, corresponding to its dispatch priority. When a processor switches to a new thread, it always selects the thread at the beginning of the highest priority non-empty dispatch queue. Threads may not change dispatch priority while on a dispatch queue; the thread must be first removed, its dispatch priority adjusted, and then the thread may be placed on a different dispatch queue.

Figure 1B:
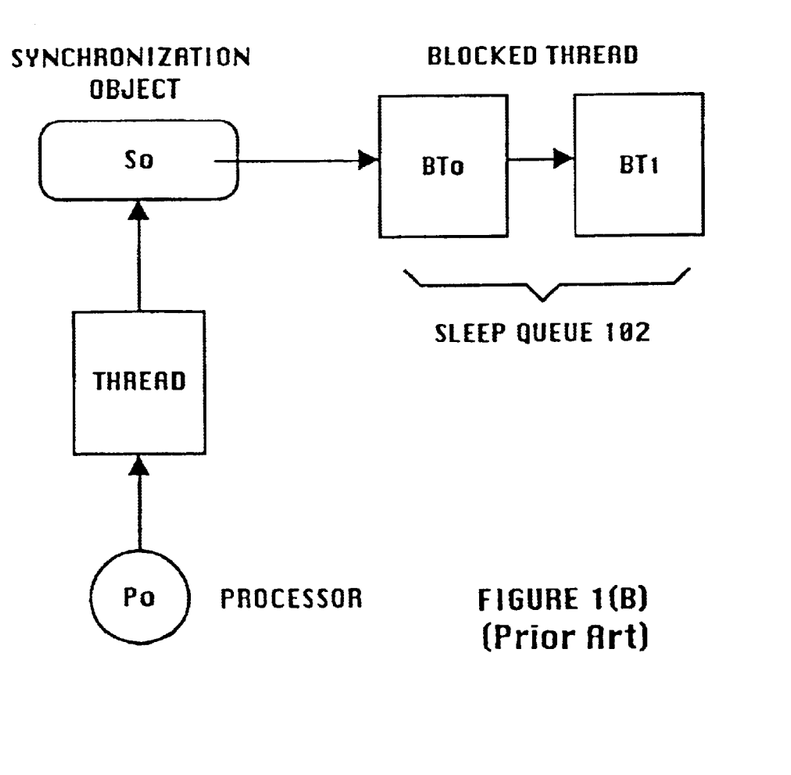
FIG. 1(B) shows a prior art single queue dispatcher system wherein blocked threads are waiting on a synchronization object.

FIG. 1(B) illustrates a prior art single queue dispatcher where a thread that needs to wait on a synchronization object is placed on a sleep queue 102 associated with the synchronization object. The sleep queue is maintained in dispatch priority order, so that when the synchronization object is released, the highest priority thread waiting for the object is at the head of the sleep queue.

The prior art system shown in FIGS. 1(A) and 1(B) uses a single spin schedule lock to protect all scheduling operations. Each scheduler may obtain or release the lock. When the schedule lock is currently held by a processor, other processors that need the schedule lock "spin" on the lock, waiting for access. In particular, whenever the release of a synchronization object makes some thread runnable, the schedule lock is held while placing the thread on the dispatch queue. To prevent interference and delays from interrupt routines, the holder of the schedule lock runs at an elevated interrupt level.

Thus, in the prior art system shown in FIGS. 1(A) and 1(B), the contention for a single schedule lock can cause processors to wait in line to make a scheduling decision, resulting in some idle processors. As a result, not only the whole purpose of using multiple processors to achieve faster job processing is defeated, but valuable computer resources go unused.

Figure 2A:
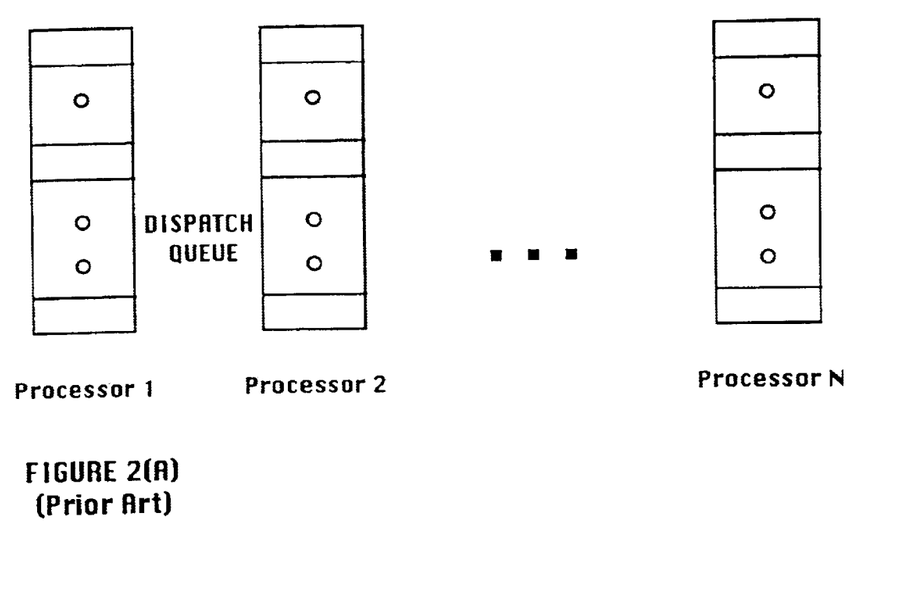
FIG. 2(A) shows a multi-queue multi-lock system.

This situation can be somewhat ameliorated by introducing a multiple dispatch queue system wherein each processor is allowed to have its own dispatch queue and its own schedule lock. Such a multi-queue multi-lock system is shown in FIG. 2(A) wherein each processor maintains its own dispatcher queue. For example, there is a separate dispatch queue associated with each of processors 1, 2, ..., N in FIG. 2(A).

In the system of FIG. 2(A), a processor ready to take a new thread starts searching for a runnable thread in its own dispatch queue. When its own queue is not empty, the processor takes the highest priority runnable thread available off its own queue. However, when its own queue is empty, the processor starts searching other dispatch queues for available threads. Still referring to FIG. 2(A), if there is an available runnable thread at any other dispatch queue, unless the thread is marked as only runnable on a particular processor, the processor can take the thread from the other dispatch queue and execute the thread. However, prior art dispatchers such as shown in FIGS. 1 and 2 are not suitable for real time applications.

A real time computing system is designed to deliver a required level of service or processing within a bounded time. Real time computing systems find applications in the areas of virtual reality, factory automation, robotics, teleconferencing, and multimedia broadcast system. These applications are typically "mixed-mode," that is, they are partitionable into schedulable entities, some of which require real time response. To achieve a bounded time response, time-critical applications require control over their scheduling behavior.

When a multiprocessor system is utilized to support real time applications, the scheduling of processes becomes even more complicated and consequently a real time operating system must be able to provide some real time capability to time critical tasks. Thus, a real time system must be capable of providing immediate response to specific external events and scheduling particular processes to run within a specified time limit after occurrence of an event. A real time system also needs to guarantee that the operating system can schedule a particular process within a fixed time limit.

Figure 2B:
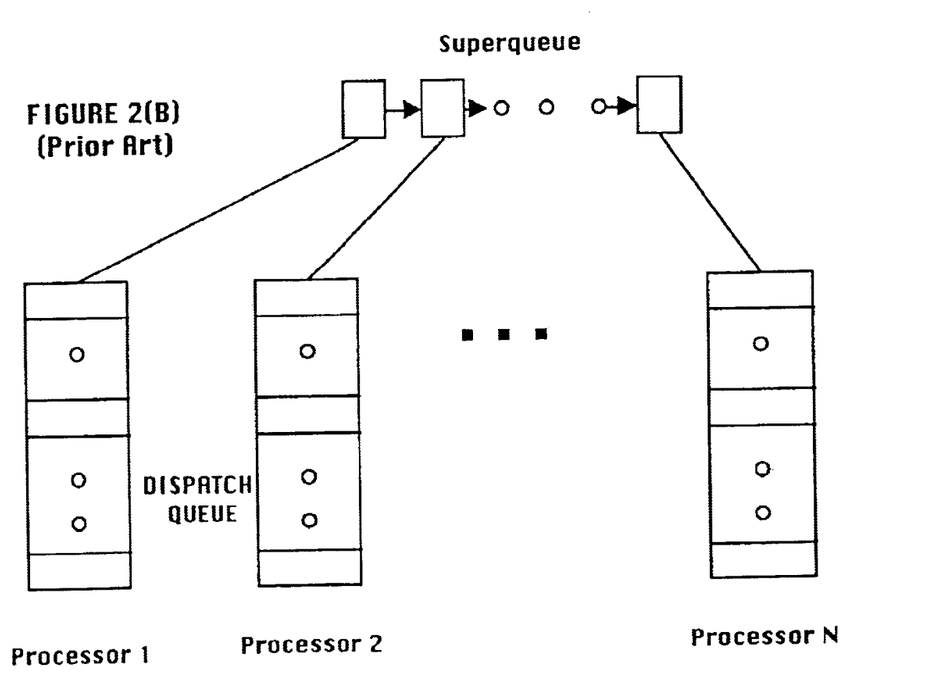
FIG. 2(B) shows a multi-queue multi-lock system with an additional superqueue.

To service real time high priority threads as rapidly as possible, the system in FIG. 2(A) can be improved to have a separate real time queue as shown in FIG. 2(B). In FIG. 2(B), an additional superqueue is added at a higher level of multiple dispatcher queues to provide system-wide visibility of runnable real time threads. The superqueue is a queue of dispatch queues containing those processor queues that hold unbound real time threads with priority higher than some predetermined threshold priority level. Thus the superqueue lists those processors whose highest priority thread has sufficient priority to be considered a real time thread.

Referring to FIG. 2(B), a processor first searches for runnable threads in the superqueue. If there is a non-empty high priority queue in the superqueue, the processor takes the highest priority runnable thread off that queue. If the superqueue is empty, the processor checks its own queue. If its own queue is still empty, then the processor goes on to other dispatcher queues for runnable threads. If there is any non-empty dispatcher queue in the system, the processor takes the highest priority runnable thread off that queue and starts executing the thread.

Real time threads would be dispatched by examining the superqueue. Thus, when a processor is selecting a thread to run, it first examines the superqueue and then its own queue.

Although the above solution outlined with respect to FIG. 2(B) represents an improvement over prior art and offers a straightforward solution to real time multiprocessor scheduling, it presents a critical race problem in scheduling real time threads. For example, a race condition can be created under the following scenario: suppose processors 1 and 2 are notified that there are two real time threads that are runnable in the superqueue. Processors 1 and 2 proceed to check the superqueue to find which processor queues have the two threads. The two real time threads are in, for example, processor 3 and processor 4's dispatch queues with the real time thread in processor 3's queue having higher priority than the one in processor 4's queue.

After finding from the superqueue that the highest real time thread is in processor 3's dispatch queue, both processors 1 and 2 attempt to access, and take the real time thread off, processor 3's queue. However, processor 1 accesses the processor 3's queue first and takes the real time thread. Then processor 2, still looking for a thread in processor 3's queue and not knowing that the highest priority real time thread has just been taken by processor 1, attempts to take the next highest priority thread off processor 3's queue. The next highest runnable thread in processor 3's queue, however, may be a very low priority one. As a result, the real time thread in processor 4's queue is left in the queue waiting to be scheduled until some processor becomes available to service it.

In the above scenario, which is an example of many possible disadvantages due to imprecise synchronization, the lack of communication between processors 1 and 2 leads to a race condition, which results in higher priority real time thread waiting in a queue while a lower priority thread is being serviced. Imprecise system synchronization, thus, can cause missed deadlines for real time threads even under low levels of processor utilization.

Thus, prior art dispatchers, fraught with race conditions and errors in the implementation of the dispatcher, can result in non-real time behavior for real time (RT) threads and in some cases can hang up the system.

Thus, presently, a variety of apparatus and methods are employed to provide a dispatcher for a multiprocessor system. However, they are not suitable for real time applications, do not deliver real time service for many applications, and are fraught with race conditions. Accordingly, it would be advantageous to provide a dispatcher that can efficiently support both time sharing (TS) and real time (RT) scheduling policies for a multiprocessor system.

SUMMARY OF THE INVENTION

The present invention provides a process scheduler or dispatcher for a multiprocessor system for real time applications. In the embodiments of the present invention, each processor has its own queue and a dispatcher so that the system can maintain a dispatch queue for each processor and a separate global dispatch-queue for unbound higher priority real time threads. Each queue has a separate schedule lock associated with it to protect scheduling operations. A processor is allowed to place a new thread on the global high priority real time queue, the processor's own queue, or any other processor's queue.

A processor's dispatcher can select a thread for execution from the global real time queue, a processor's own queue, or another processor's queue as a candidate thread to execute, based upon priority variables associated with each queue. The examination of the priorities on queues for thread selection does not require any schedule locks and miscommunication is prevented by using a suitable synchronization algorithm. When a candidate thread is selected for execution, the processor notifies other processors of its selection and proceeds to verify against threads in the global real time queue and the processor's own dispatch queue to select the highest priority runnable thread in the system.

Thus, the present invention allows the dispatcher to prevent race conditions and minimize lock contention while assuring that high-priority threads are dispatched as quickly as possible. The preferred embodiment of the present invention is implemented by a synchronization between the operations of dispatching a thread and making a thread runnable.

DETAILED DESCRIPTION OF THE INVENTION

The present invention is a multiprocessor scheduling system described with respect to real time applications. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention.

In a multiprocessor system, there are basically two resource allocation decisions that are made. One is where to locate code and data in physical memory and the other is on which processor to execute each process—an assignment decision or processor management. These decisions are challenging in a multiprocessor system and optimization of the processor management is important in a multiprocessor system.

Assignment decision or job and processor scheduling includes multi-level scheduling policies: high-level scheduling or job scheduling that determines which jobs shall be allowed to compete actively for system resources; intermediate-level scheduling that determines which processes shall be allowed to compete for system resources; and low-level scheduling performed by a dispatcher. A dispatcher determines which ready process will be assigned to which processor when it next becomes runnable.

A fully preemptive scheduling scheme is used in the preferred embodiment of the present invention, in which a processor can be taken away from a process that it is currently running to let other higher priority process come in for execution. Although preemption involves overhead due to context switching, it is useful in systems in which high priority processes require rapid attention. In real time systems, for example, missing a hard deadline can bring fatal consequences and thus, preemptive scheduling is necessary in guaranteeing acceptable service times.

In the present invention, a process scheduler or dispatcher performs its function each time a running process is blocked or preempted. Its purpose is to select the next running process from the set of ready queues. The dispatcher resides in the operating system kernel, monitoring the ready queues and handling requests to load applications. This involves creating all the tasks and threads of the application, reserving memory, and loading the code and data into the memory. All the resources are reserved before an application is considered successfully loaded and ready to run. Thus, a dispatcher should be fairly efficient to minimize operating system overhead.

In a multiprocessor system, real time priority scheduling must meet one constraint: for each processor, there is no higher priority thread on any queue than can be run on that processor. From throughput point of view, it is best that each processor has its own dispatch queue, thus minimizing the lock contention between processors.

This embodiment of the present invention, therefore, proposes a dispatcher model that maintains a separate global dispatch queue for unbound higher priority real time threads in addition to processors' own dispatch queues. Further, instead of guaranteeing that the dispatcher always makes correct decisions, this embodiment of the present invention uses a select and verify scheme. Both of these features allow this embodiment of the present invention to minimize lock contention while assuring that high-priority threads are dispatched as quickly as possible. This is implemented by a synchronization between the operations of dispatching a thread and making a thread runnable. The dispatcher model of this embodiment of the present invention is implemented in SunOS Solaris 2.5.

Figure 3:
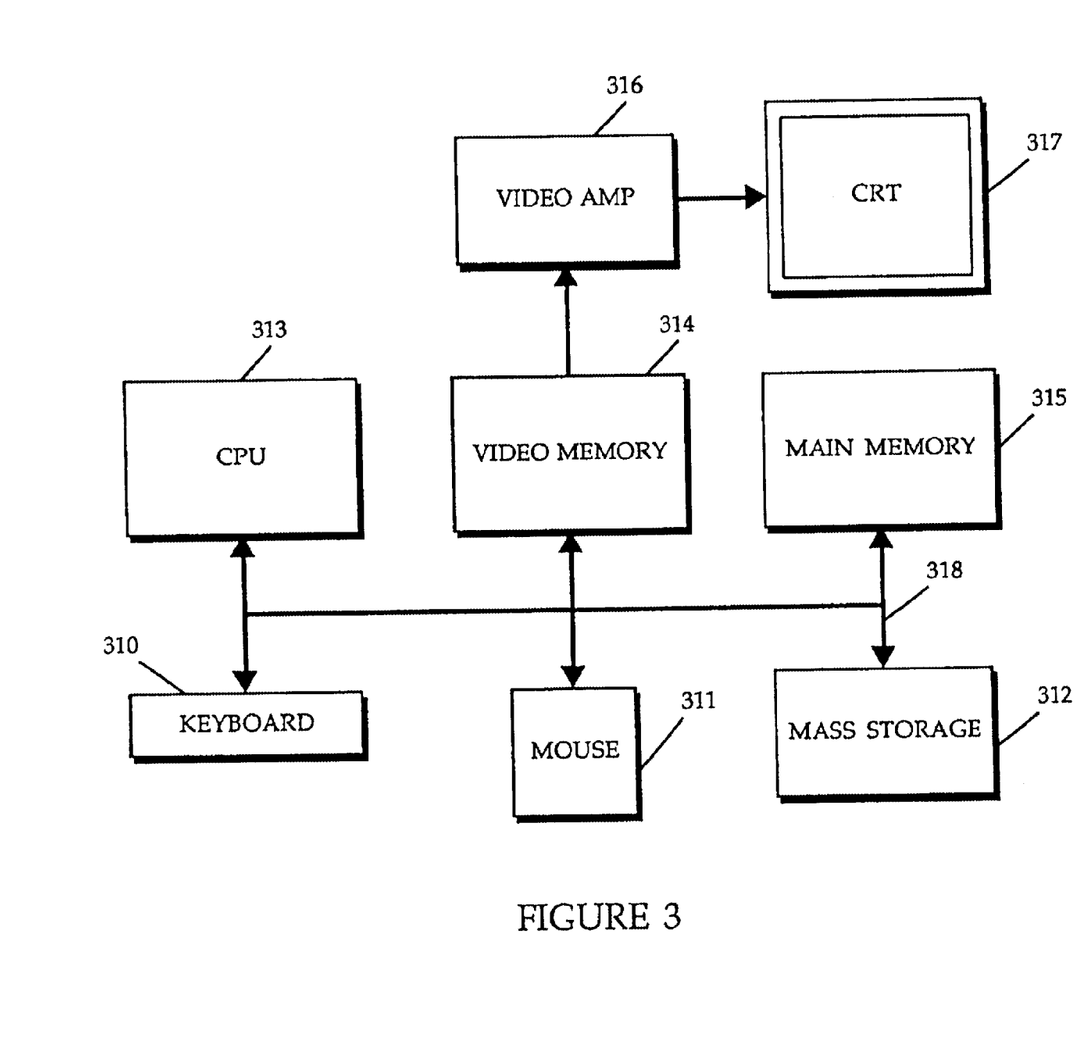
FIG. 3 illustrates a general purpose computer suitable for implementing an embodiment of the invention.

The present invention can be implemented on a general purpose computer such as illustrated in FIG. 3. A keyboard 310 and mouse 311 are coupled to a bi-directional system bus 318. The keyboard and mouse are for introducing user input to the computer system and communicating that user input to CPU 313. The computer system of FIG. 3 also includes a video memory 314, main memory 315 and mass storage 312, all coupled to bi-directional system bus 318 along with keyboard 310, mouse 311 and CPU 313. The mass storage 312 may include both fixed and removable media, such as magnetic, optical or magnetic optical storage systems or any other available mass storage technology. Bus 318 may contain, for example, 32 address lines for addressing video memory 314 or main memory 315. The system bus 318 also includes; for example, a 32-bit DATA bus for transferring DATA between and among the components, such as CPU 313, main memory 315, video memory 314 and mass storage 312. Alternatively, multiplex DATA/address lines may be used instead of separate DATA and address lines.

Main memory 315 is comprised of dynamic random access memory (DRAM). Video memory 314 is a dual-ported video random access memory. One port of the video memory 314 is coupled to video amplifier 316. The video amplifier 316 is used to drive the cathode ray tube (CRT) raster monitor 317. Video amplifier 316 is well known in the art and may be implemented by any suitable means. This circuitry converts pixel DATA stored in video memory 314 to a raster signal suitable for use by monitor 317. Monitor 317 is a type of monitor suitable for displaying graphic images.

The computer system described above is for purposes of example only. The present invention may be implemented in any type of computer system or programming or processing environment.

Figure 4A:
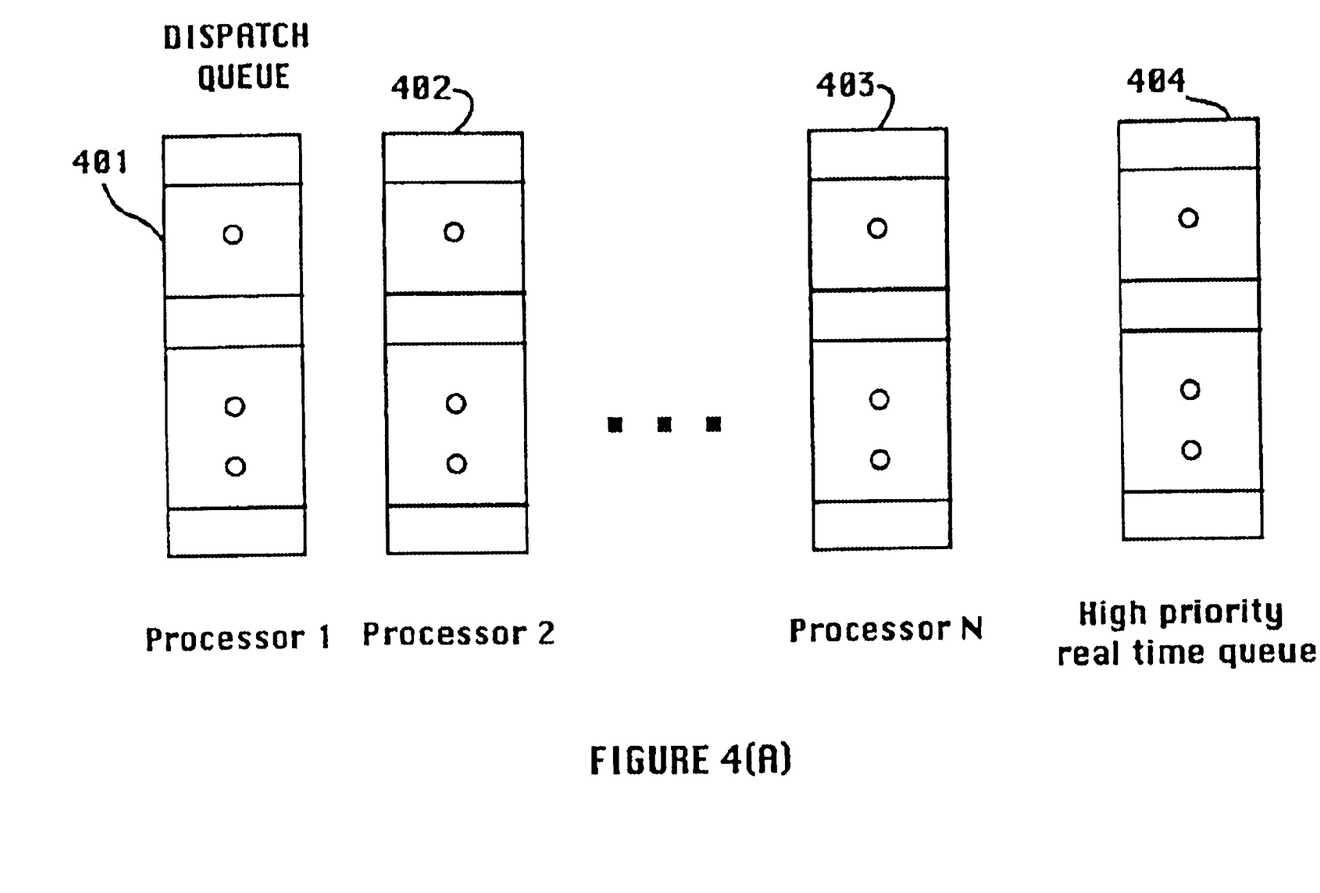
FIG. 4(A) shows a preferred embodiment of multiple dispatcher queue system according to the present invention.

FIG. 4(A) shows a multiple dispatcher queue system according to a preferred embodiment of the present invention. Referring to FIG. 4(A), the multiple dispatcher queue system comprises separate dispatcher queues 401, 402, . . . , 403 for processors 1, 2, . . . , N and in addition, a global high priority real time queue 404, which is used to hold high priority real time threads. Each dispatch queue has its own scheduling lock associated with it to protect all scheduling operations so that any processor attempting to dispatch a thread from a queue needs to acquire a lock for that queue before taking the thread off the queue. Thus, lock contention is reduced in the present invention with multiple schedule locks for multiple dispatch queues in contrast to prior art schedulers wherein a single schedule lock is used for a single dispatch queue for all processors.

In the preferred embodiment of FIG. 4(A), a dispatcher uses an array of dispatch queues, indexed by dispatch priority. Also, when a thread is made runnable, it is placed on a dispatch queue, typically at the end, corresponding to its dispatch priority. However, other schemes can be used for queueing instead of FIFO thread queueing. For example, LIFO (Last In First Out), SJF (Shortest Job First), SRT (Shortest Remaining Time) or other sophisticated queueing mechanism can be used depending on real time application scheduling requirements.

Figure 4B:
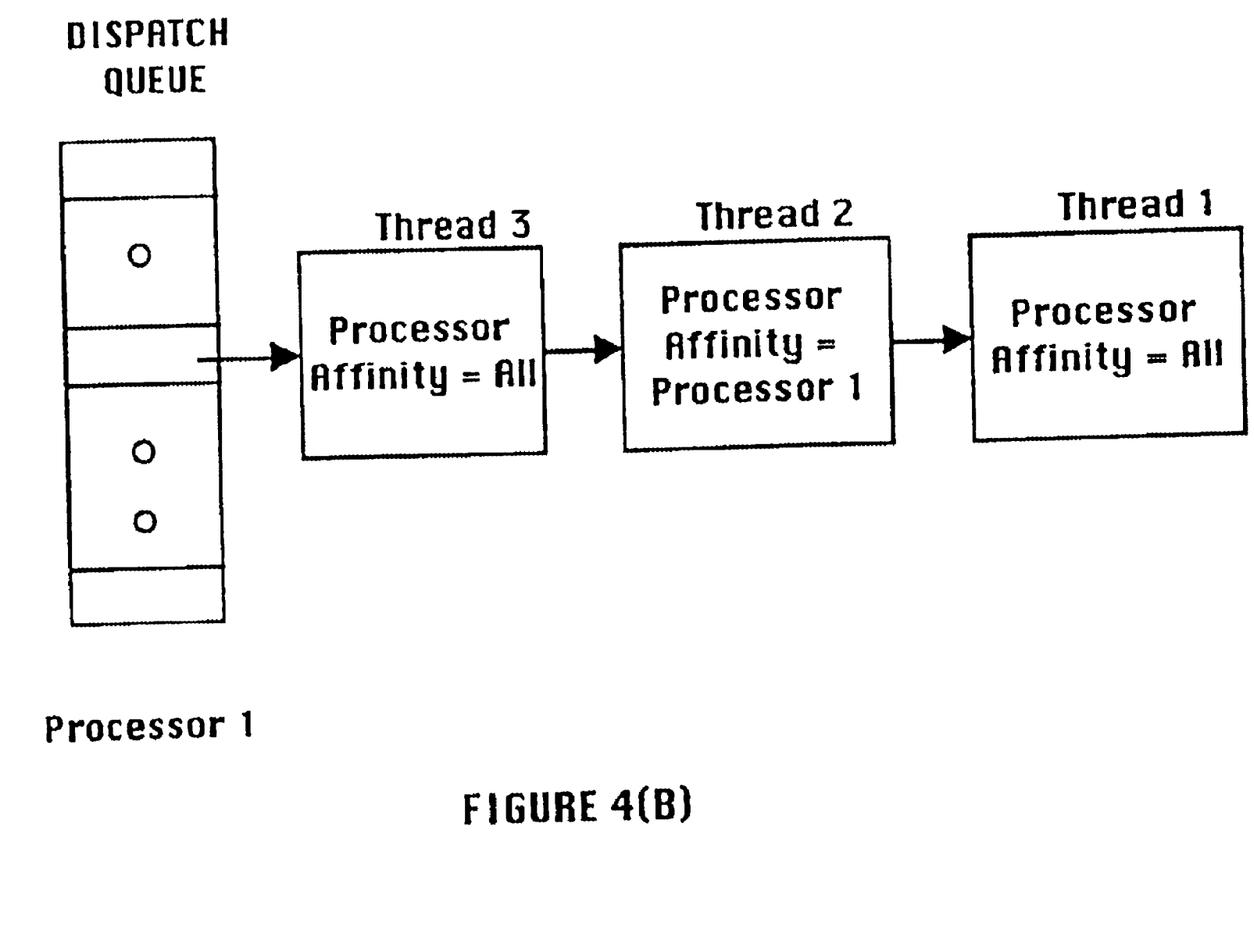
FIG. 4(B) shows a dispatch queue structure in greater detail using dispatch queue for a processor of FIG. 4(A).

FIG. 4(B) shows a dispatch queue structure in greater detail using dispatch queue for processor 1 of FIG. 4(A). In FIG. 4(B), threads 1, 2, and 3 of some priority value are queued in the dispatch queue. Thread 1 is on top of the queue and, if a FIFO system is applied, would be the first thread in that priority category to be dispatched from the queue for execution. Threads in FIG. 4(B) also have processor affinity characteristics associated with them.

A processor affinity is used to determine on which processors a thread can execute. Most of threads are executable on all processors and are accordingly labeled so. However, there are threads that are only executable on a particular processor and no other processors. This thread then is given a processor affinity for that particular designated processor. When a thread has an affinity for a particular processor, it cannot be stolen by, or migrate to, other processors. Thread 2 in FIG. 4(B), for example, has a processor affinity for processor 1 and is only executable on processor 1. Thus a thread that is only runnable on one processor, i.e. a bound thread, can only appear on its bound processor's dispatch queue and will only be dispatched by that processor.

For a processor to be able to steal a thread from other processors, the thread must be runnable on the stealing processor. For example, referring to FIG. 4(B), threads 1 and 3 can be stolen, taken off the queue, and executed by other processors than processor 1.

Figure 5:
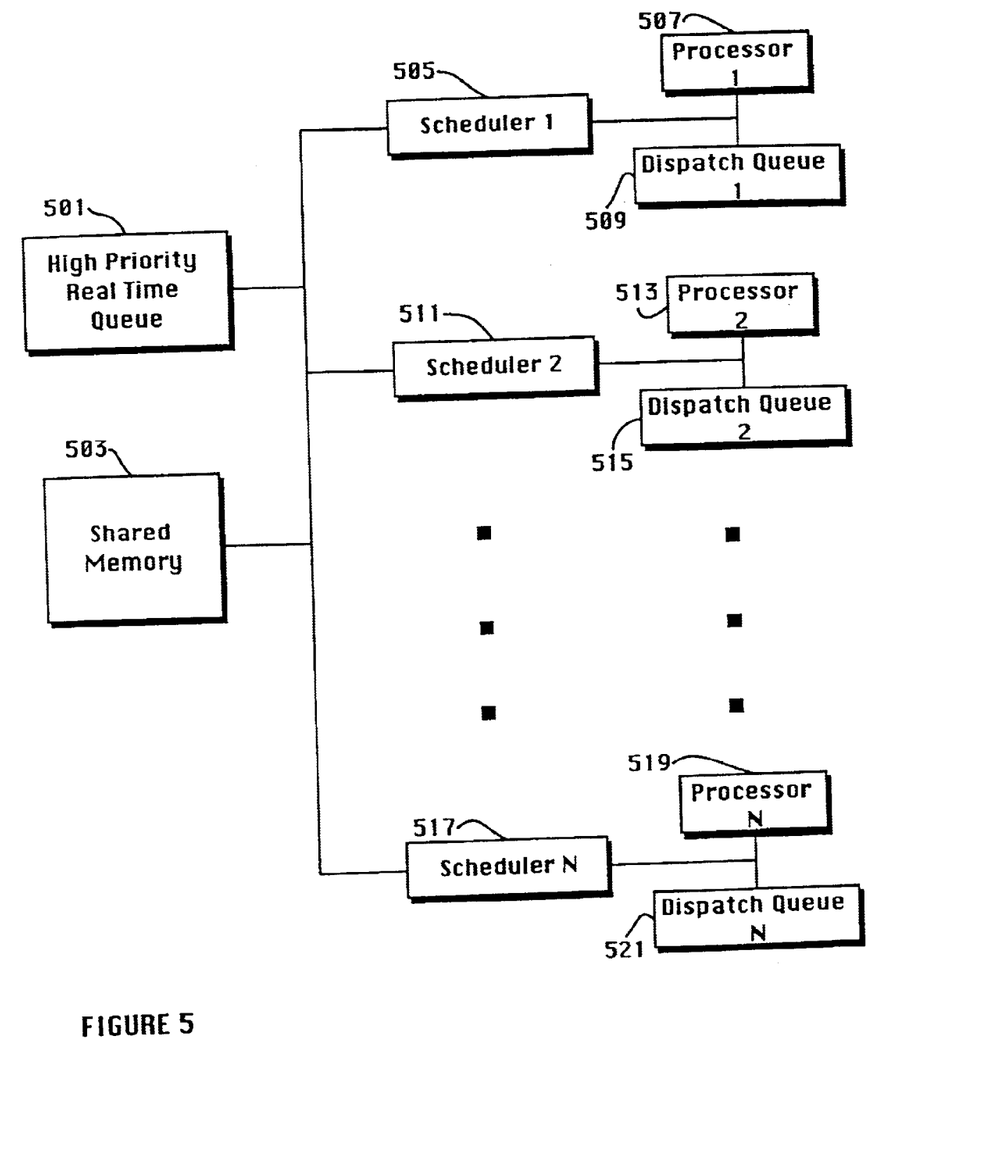
FIG. 5 shows a preferred configuration of the multiprocessor system according to the present invention.

FIG. 5 shows a configuration of the mutiprocessor system according to a preferred embodiment of the present invention. Each processor 1, 2, . . . , N has its own scheduler and dispatch queue as shown in FIG. 5. For example, processor 1 has scheduler 505 and dispatch queue 509 coupled to it through a bus. Schedulers or dispatchers determine when and which threads are to be dispatched for execution on the system processors. Schedulers 1, 2, . . . , N and therefore processors 1, 2, . . . , N are coupled via a bus to global high priority real time queue 501 and shared memory 503. Threads can interact using synchronization objects that are shared by all processors.

Associated with each processor in FIG. 5 are a set of scheduling variables used for various purposes. For example, variables cpu_runrun and cpu_kprunrun record requests for preemption of the current thread and are used to make scheduling decisions. Other variables include cpu_dispthread and cpu_thread. The variable cpu_thread refers to the thread currently executing on a processor. The variable cpu_dispthread is used for communication with other processors and records the identity of the thread last selected for dispatch on the processor.

The variable cpu_runrun or cpu_kprunrun is set for a processor by other processors when they put a new thread in the processor's queue and find that the processor is running a thread of lower priority than the new thread just put on the processor's queue. The variable cpu_kprunrun has higher priority than the variable cpu_runrun. When variable cpu_runrun or cpu_kprunrun is set, the processor needs to make a scheduling decision to preempt the current thread and service a new higher priority thread.

Any processor in FIG. 5 is capable of putting a thread on any of the queues in the system for execution. For example, processor 1 can put a new thread on its own queue, the global high priority real time queue, or other processors' queues unless the new thread has a particular processor affinity characteristic.

Although FIG. 5 shows multiprocessors connected via a single bus, other alternate architectures are certainly possible for an embodiment of the present invention. For example, multibus multiprocessor organization or crossbar switch system can be used for interconnection network to enhance the multiprocessor system performance.

Figure 6:
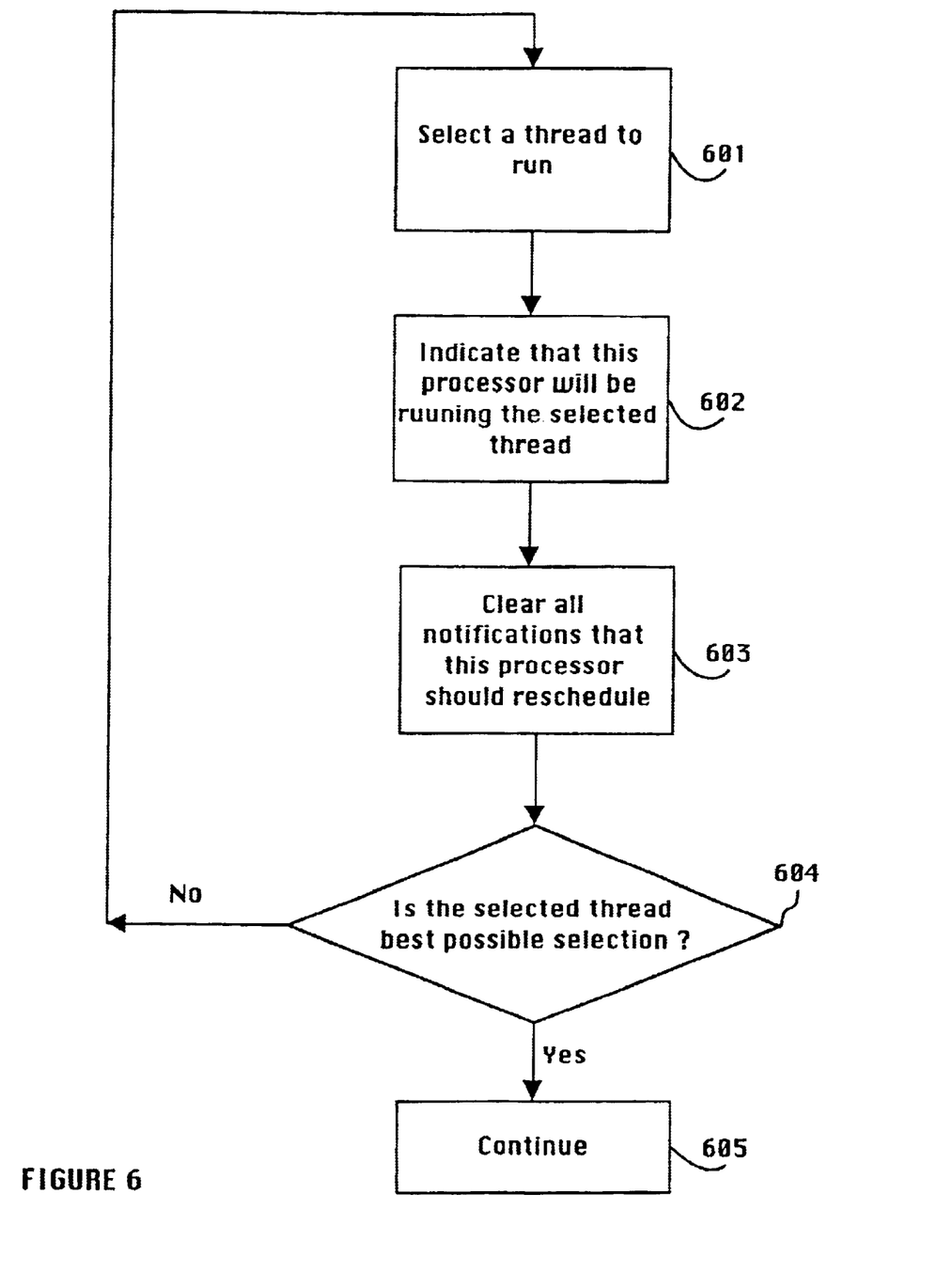
FIG. 6 shows a flowchart describing a dispatcher scheduling a thread to run on a processor.

To dispatch or schedule a thread on a processor, the processor needs to find a thread to run. FIG. 6 shows a flowchart describing a dispatcher scheduling a thread to run on a processor using a select and verify scheme.

Figure 7:
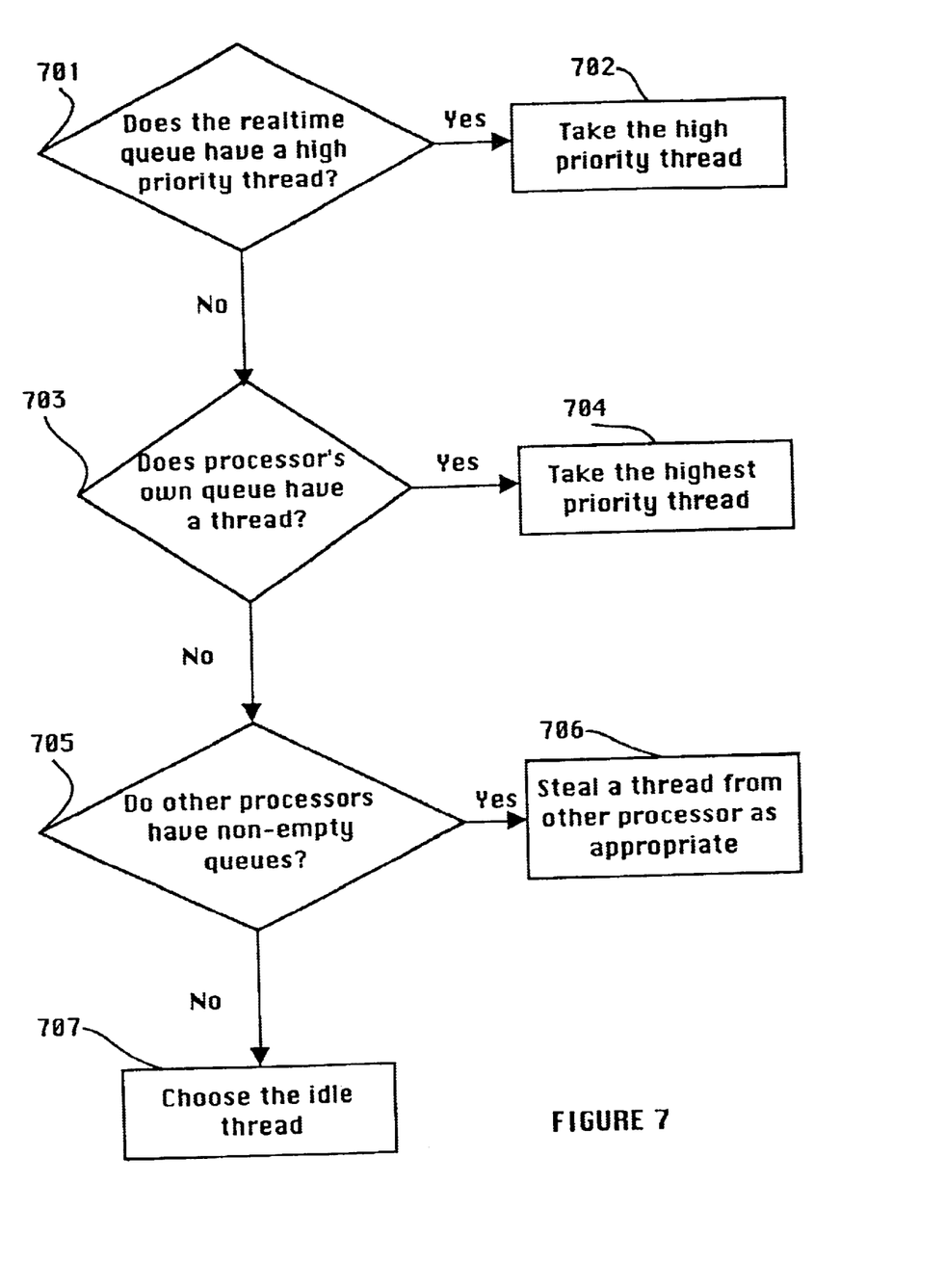
FIG. 7 shows a flowchart describing in greater detail the thread selection process of step 601 of FIG. 6.

Referring to FIG. 6, a processor ready for a next thread starts to select a thread to run by checking in the high priority real time queue to see if it has any entries at step 601. FIG. 7 shows a flowchart describing in greater detail the thread selection process of step 601.

The examination of the priorities on queues involve checking local variable associated with each processor and does not require any locks. For example, priority variable disp_maxrunpri can be used to indicate maximum priority level on a queue. Then variable disp_maxrunpri can be checked on both the processor dispatch queue and the real time queue using some suitable synchronization algorithm such as Dekker's algorithm to prevent miscommunication. However, any other suitable synchronization algorithm can be used in alternate embodiments of the present invention. Since the priority variables to be examined are atomic variables that are maintained in each dispatch queue, any scheduling errors caused by selecting a wrong queue will be caught in the a verification step. However, a schedule lock is required to take a thread from a selected queue.

Referring now to FIG. 7, if the real time queue has a higher priority thread than its own dispatch queue at decision block 701, the processor dispatcher acquires a lock for the real time queue and takes a highest priority thread at step 702 from the real time queue such as queue 404 of FIG. 4 and proceeds to execute the thread.

A processor that becomes available to take a next thread first looks at the real time queue before checking their own queues, thereby servicing threads in the higher priority real time queue ahead of threads in their own queues to provide the fastest possible service to real time threads. If, at decision block 701, it is determined that the real time queue has no higher threads available, the processor proceeds to step 703 to check its own dispatch queue for a runnable thread. If its own queue is not empty, then the processor proceeds to step 704 to acquire a lock for its own queue and take a highest priority thread off its own queue.

If the processor's own dispatch queue is empty, then the processor proceeds to step 705 where it checks other processors' dispatcher queues to find a runnable thread. If there is a runnable thread with no particular processor affinity in any other dispatch queue, the processor acquires a scheduling lock for that dispatch queue and proceeds to steal the thread from the other processor at step 706.

If the processor cannot find any non-empty dispatch queues or runnable threads in them at decision block 705, the processor proceeds to step 707 to choose an idle thread, thereby completing the thread selection process. An idle thread is a special thread that has a lower priority than any dispatch priority and never appears in the dispatch queue. An idle thread is selected for execution whenever no other thread is runnable, and switches whenever another thread becomes runnable.

Thus, a thread can be selected for execution by a processor from any one of the high priority queue, its own dispatch queue, and other processors' dispatch queues in the system. However, by first checking the high priority real time queue such as 404 before checking its own queue or other dispatch queues, a processor gives higher priority to the real time queue than other dispatch queues. This global priority mapping is illustrated in FIG. 8.

Figure 8:
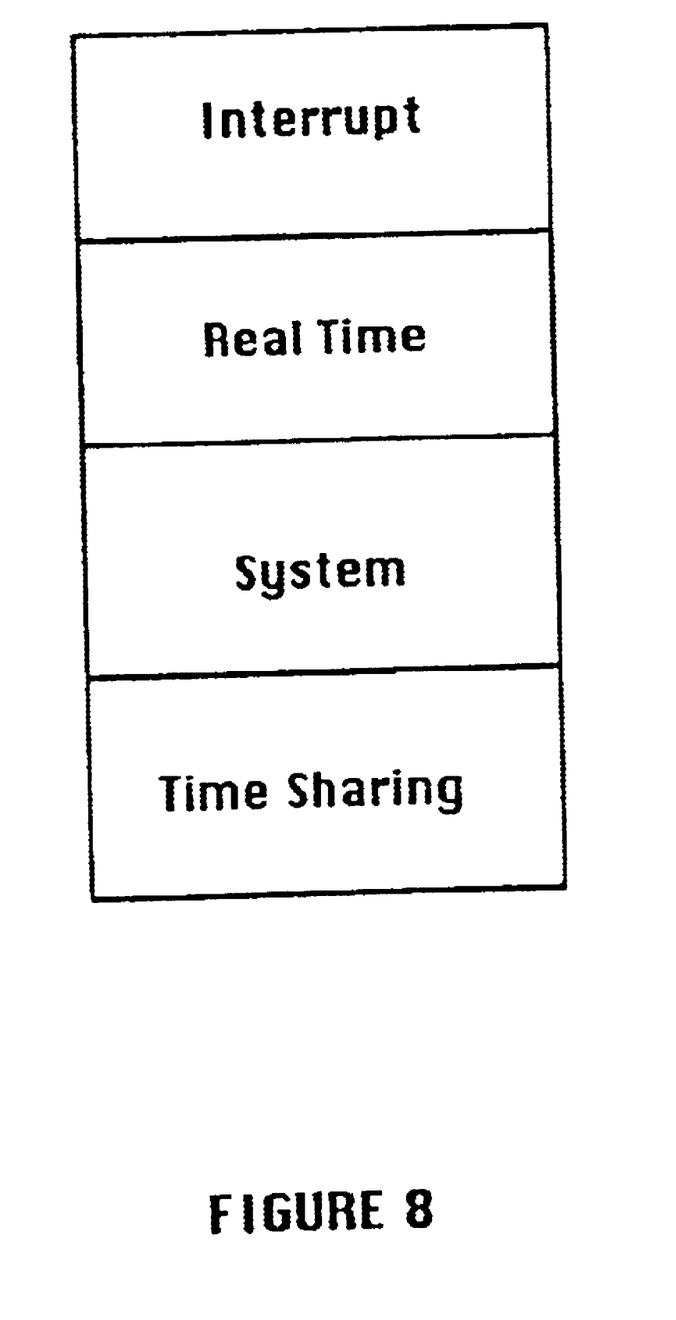
FIG. 8 illustrates a global priority mapping strategy.

As shown in FIG. 8, the time-sharing threads are given the lowest priority in job scheduling or dispatching. The time-sharing threads are supported by a time slicing technique and scheduled dynamically with a few hundred milliseconds per time slice. The time-sharing scheduler switches the context in a round-robin fashion often enough to give every thread an equal opportunity to run. The system threads having higher priority than the time-sharing threads comprise special system threads and interrupt threads. Interrupt threads are always given the highest priority in the system.

Real time threads are situated between interrupt threads and the system threads in FIG. 8. Real time threads are scheduled strictly on the basis of their priority and the time quantum associated with them. A time quantum or time slice is assigned to a thread to limit the amount of processor time allowed to run the thread. If a thread does not complete before its time quantum expires, the thread is preempted and the next waiting highest priority thread is dispatched to execute. For example, a real time thread with infinite time quantum runs until it terminates, blocks, or is preempted.

The criteria for determining what priority level can be used as dividing lines for different priority regions in FIG. 8, and therefore what priority thread qualifies to be in, for example, the global real time queue, can be set by considering a number of factors. For example, threads in the real time queue are optimized for responsiveness while thread not in the real time queue are optimized for throughput, maximizing the number of instructions executed per unit time.

Referring back to FIG. 6, after selecting a candidate thread to run at step 601, the processor proceeds to step 602 where it releases the schedule lock it acquired in step 601 after broadcasting to other processors a tentative notification that it will be running the selected candidate thread by setting local processor variables, for example by setting variable cpu_dispthread to indicate the most updated thread priority.

At step 603, the processor clears all notifications that this processor should reschedule by, for example, clearing cpu_runrun and cpu_kprunrun variables. However, the processor still can not confirm that the selected candidate thread is the highest priority runnable thread it can take since there is a possibility that a new higher priority thread could have been placed in the global real time queue or in its own queue by some other processors while the processor was in the thread selection process. This can create the race conditions as discussed earlier in the background unless the scheduler can verify that the selected candidate thread is the best choice.

Thus, at step 604, a verification is made as to whether the selected thread is a best possible selection. This requires going back to the high priority real time queue and its own queue, and checking them again to see if there is a higher priority thread newly placed in the high priority real time queue or its own queue. If the selected candidate thread has higher priority than any other thread in either queue, then the processor continues to step 605 to execute the selected candidate thread.

If, however, a new higher priority thread is found in either queue, the selecting processor puts the selected candidate thread back on some queue, probably on the queue the thread was taken off, depending on a queue placement algorithm, and goes back to step 601 to start the thread selection process anew.

The select and verify scheme of this embodiment of the present invention, thus, guarantees that the final selected thread will indeed have the highest priority that the processor can select to execute. Also, the race problems such as discussed in the background art are now prevented and higher priority threads in the system are guaranteed a real time service with minimum dispatch latency.

Figure 9:
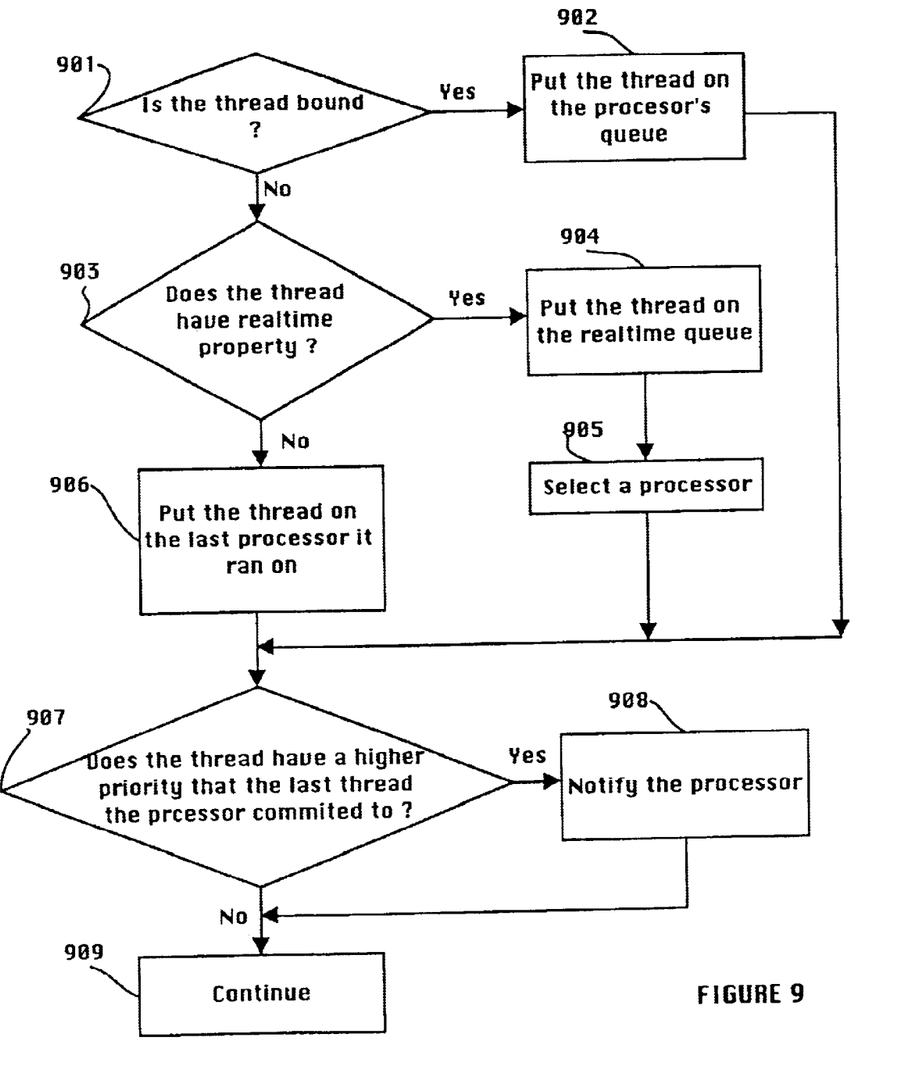
FIG. 9 shows a flowchart describing a processor making a thread runnable.

FIG. 9 shows a flowchart describing a processor making a thread runnable. At step 901, a processor is selected for the thread and at decision block 901, a determination is made whether the thread is bound. If the thread is bound, the thread is put on the selected processor's queue at step 902. If the thread is not bound, a determination is made at decision block 903 as to whether the thread has real time property. Real time threads are threads that have sufficient priority that responsiveness of the system in dispatching the threads is more important than throughput.

A predetermined threshold value can be used as a criterion to distinguish real time threads. For example, variable kppreemptpri is used in the preferred embodiment as the threshold value to determine real time threads. Variable kppreemptpri can be set to any appropriate value depending upon system applications. Thus, if the thread is unbound and its priority is above kppreemptpri, the thread is put on the high priority real time queue at step 904. At step 905, a processor is selected to schedule the thread on before proceeding to step 907. If, at step 903, it is determined that the thread has a priority below kppreemptpri, then the processor proceeds to step 906 to put the thread on the processor it last ran on and proceeds to step 907.

Figure 10:
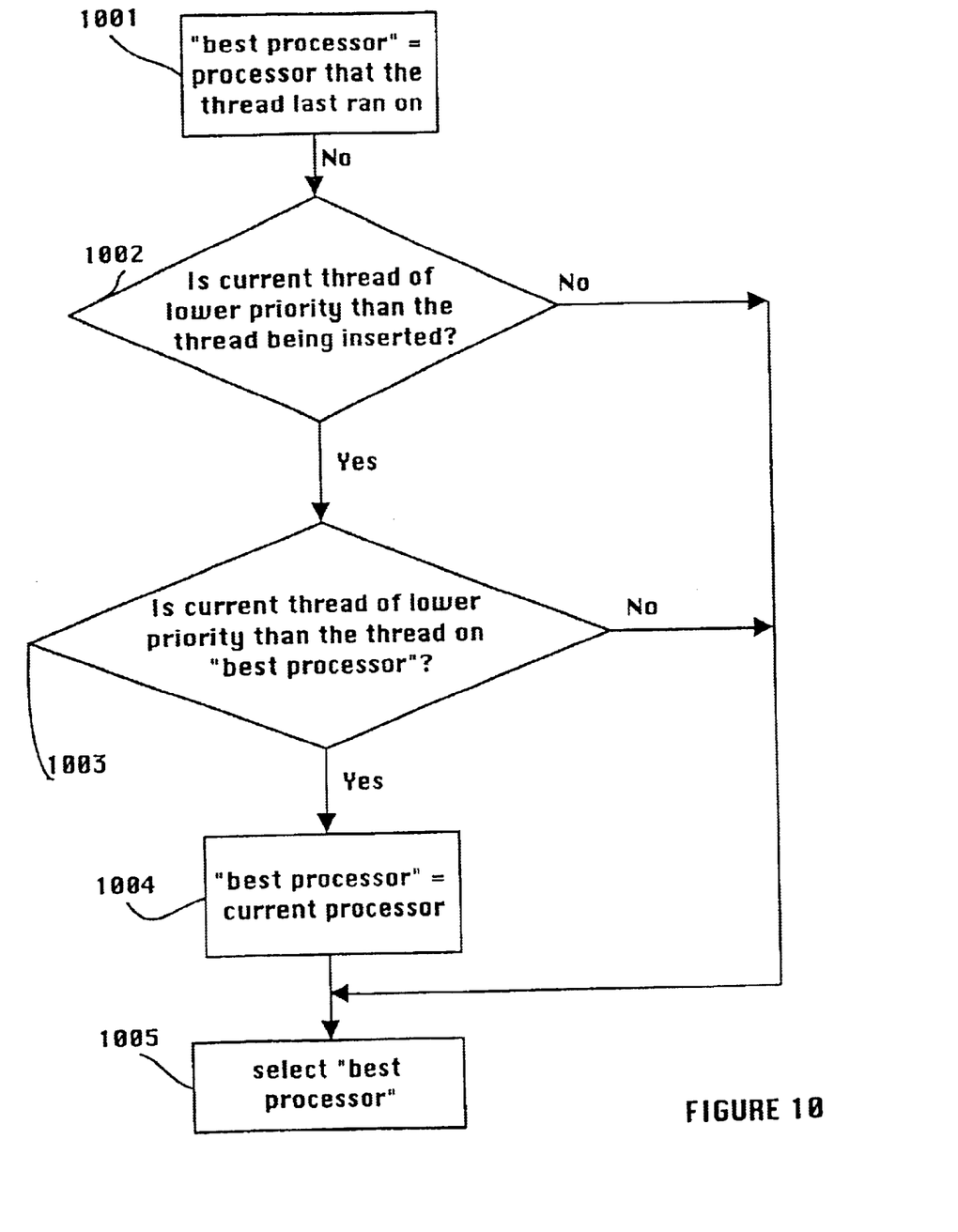
FIG. 10 illustrates a flowchart describing in greater detail the processor selection step 905 of FIG. 9.

FIG. 10 illustrates the processor selection step 905 of FIG. 9 in greater detail. At step 1001, "best processor" is set to be the processor the thread last ran on. Then each processor in the system determines if its current thread is of lower priority than the thread being inserted at step 1002. If its current thread is of higher priority, then it proceeds to step 1005. Otherwise, a determination is made at step 1003 whether the processor's current thread is of lower priority than the thread on "best processor." If the current thread is of lower priority, then at step 1004, "best processor" is set equal to current processor. At step 1005, "best processor" is selected as the target processor to schedule the thread being inserted.

Turning back to FIG. 9, after a target processor is selected to run the thread, a determination is made, at decision block 907, as to whether the thread has a higher priority than the last thread the processor committed to. If the thread has a higher priority, the processor is notified at step 908 by setting some local variables, for example cpu_runrun and cpu_kprunrun variables. If the thread does not have a higher priority at step 907, the scheduling processor continues to step 909.

It is understood that particular embodiments described herein should not limit the present invention thereby. This invention can be practiced in connection with any multiprocessor system that uses a preemptive priority scheduling system.

Thus, a process scheduler or dispatcher for a multiprocessor system suitable for real time applications has been described.

What is claimed is:

1. A multiprocessor scheduling system comprising:
   a plurality of processors;
   a plurality of schedulers, each of said plurality of processors coupled to one of said plurality of schedulers;
   a plurality of local dispatch queues, each of said plurality of processors coupled to one of said plurality of local dispatch queues;
   said plurality of schedulers coupled to a communication medium;
   a global dispatch queue coupled to a communication medium;
   a shared memory coupled to said communication medium;
   wherein said plurality of local queues and said global queue each have a respective lock that is obtained before a thread is removed from the respective queue, and wherein said plurality of schedulers are coupled to a communication medium wherein at least one of said plurality of schedulers is configured to:

select for execution on an associated one of said plurality of processors a candidate highest priority runnable thread from said global dispatch queue and one of said local dispatch queues;

notify said plurality of processors of the candidate highest priority runnable thread;

verify that the selected thread is the highest priority thread by checking whether a higher priority thread having higher priority than said candidate thread is available on said global dispatch queue or one of said local dispatch queues;

preempt the selected thread with a new highest priority thread if the verification is negative.

2. The multiprocessor scheduling system of claim 1 wherein said global dispatch queue stores real time threads.

3. The multiprocessor scheduling system of claim 1 wherein said shared memory comprises a register accessible by said plurality of schedulers.

4. A multiprocessor system comprising:

a plurality of processors;

a plurality of local dispatch queues, each of said plurality of local dispatch queues associated with a respective one of said plurality of processors;

a global dispatch queue accessible by said plurality of processors; and a dispatcher configured to:
select a highest priority thread as a first thread for execution by one of said plurality of processors, said highest priority thread selected from said global queue and at least one of said local dispatch queues;

after obtaining said first thread, verify that said first thread is the highest priority thread by checking whether a higher priority thread having higher priority than said candidate thread is available on said global dispatch queue or one of said local dispatch queues; and preempt said first thread with a higher priority thread if the verification is negative.

5. The system of claim 4, wherein said dispatcher is configured to select said highest priority thread by performing the steps of:

selecting the highest priority runnable thread from said global queue;

selecting the highest priority runnable thread from an associated local dispatch queue when there is no runnable thread in said global queue.

6. The system of claim 5, wherein said dispatcher is configured to select said highest priority thread by performing the further step of selecting the highest priority thread from local dispatch queues other than said associated local dispatch queue when there is no runnable thread in said global queue and said associated local dispatch queue.

7. The system of claim 6, wherein said dispatcher is configured to select said highest priority thread by performing the further step of selecting an idle thread when there is no runnable thread in said global queue and said plurality of local dispatch queues.

8. The system of claim 4, wherein a newly runnable thread that is bound to a given processor is placed in the local dispatch queue associated with the given processor.

9. The system of claim 4, wherein threads that have a real time property are stored in said global queue.

10. The system of claim 4, wherein a previously run thread is placed into the local dispatch queue associated with the processor that previously ran the thread.

11. The system of claim 4, further comprising a memory accessible by said plurality of processors, said memory comprising a register value used to notify said plurality of processors of said first thread.

12. The system of claim 4, further comprising a plurality of dispatchers, each associated with a respective processor.

13. The system of claim 12, wherein each of said plurality of local dispatch queues and said global queue has a respective lock, and wherein a dispatcher obtains said lock prior to obtaining a thread from the respective queue.

14. The method of claim 4 wherein threads can be executed directly from either said global queue or said local dispatch queues.

* * * * *